Feb. 5, 1957
J. G. RUSSELL
2,780,236
LOCKING AND RELEASING MECHANISM FOR
FLOAT CONTROLLED PILOT VALVE
Filed April 30, 1953
3 Sheets-Sheet 1
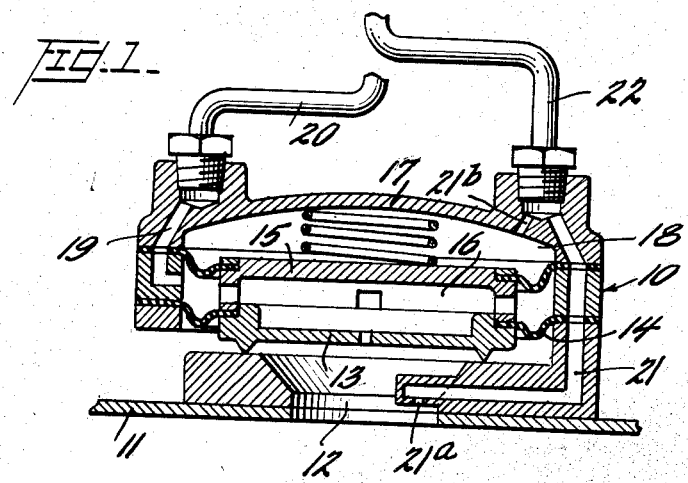
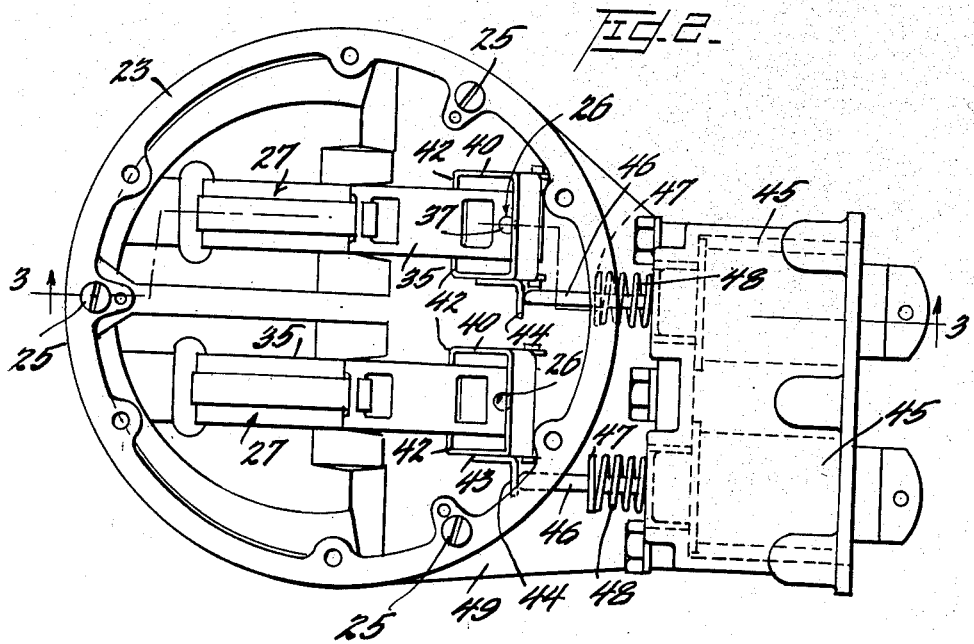
INVENTOR
*John G. Russell,*
BY *Mason, Porter, Diller & Stewart*
ATTORNEYS Feb. 5, 1957  J. G. RUSSELL  2,780,236
LOCKING AND RELEASING MECHANISM FOR
FLOAT CONTROLLED PILOT VALVE
Filed April 30, 1953
3 Sheets-Sheet 2
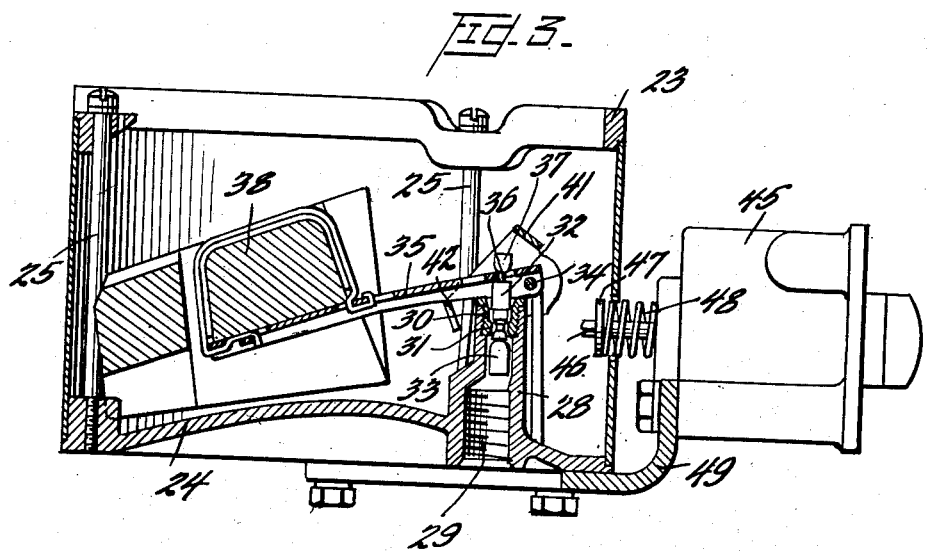
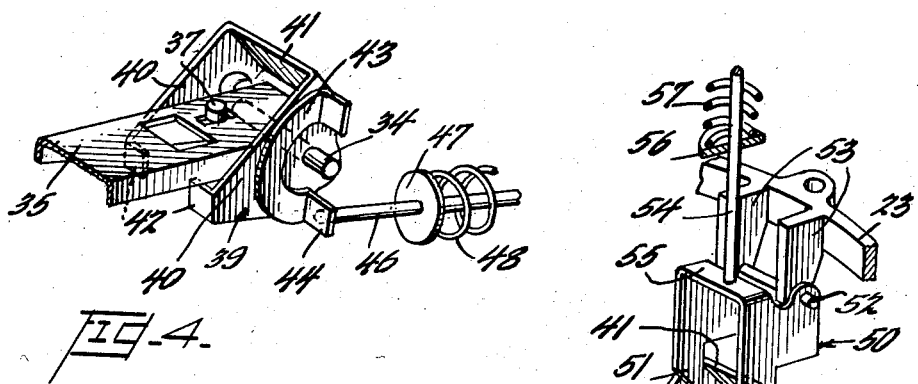
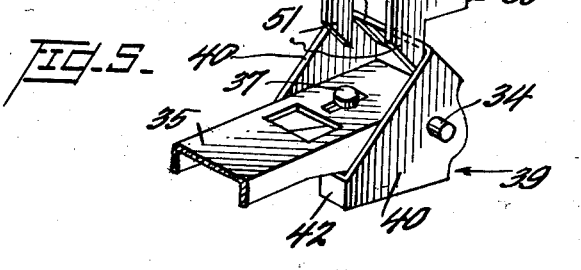
INVENTOR
John G. Russell,
BY Mason, Porter, Diller & Stewart
ATTORNEYS

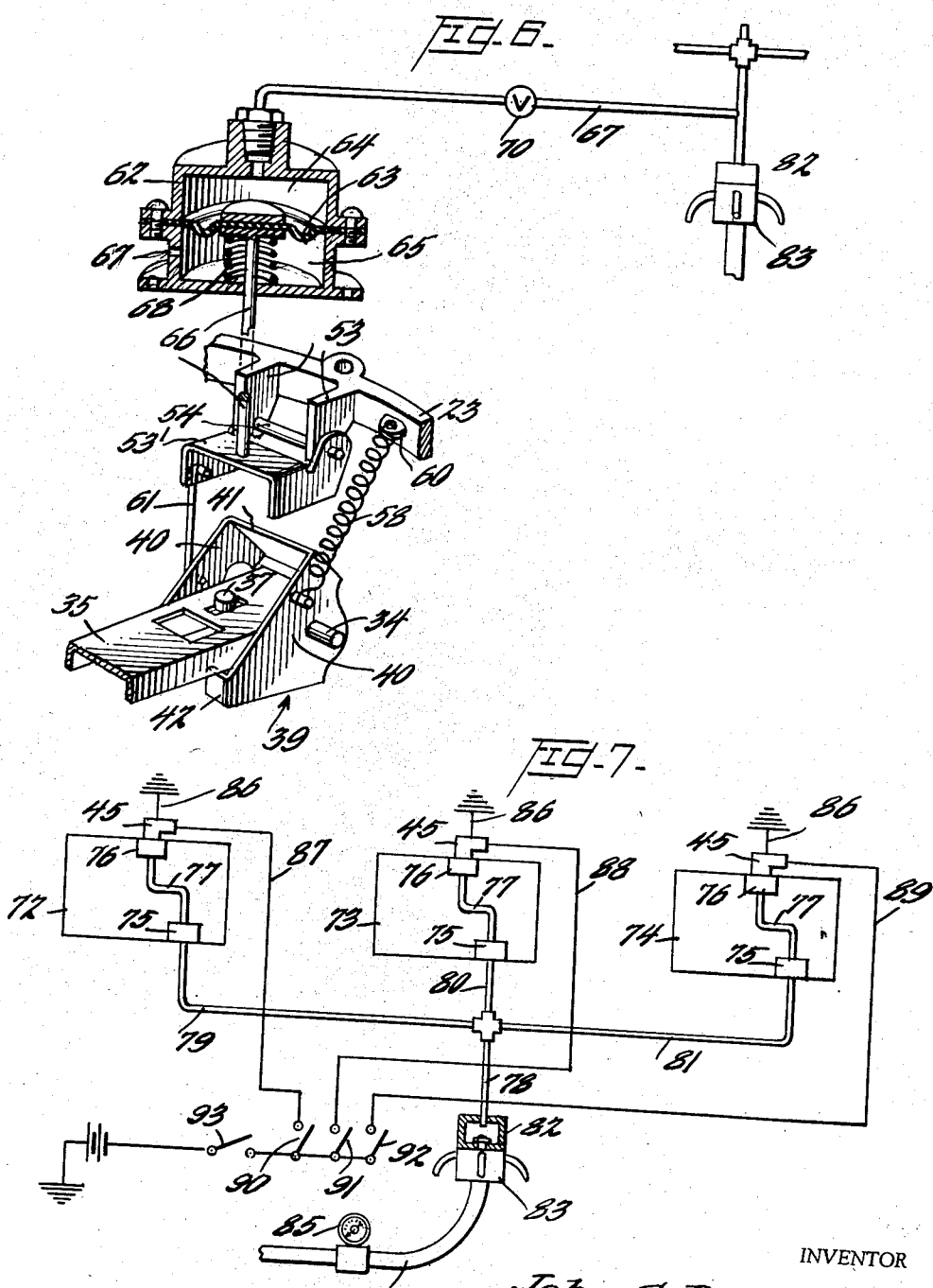

United States Patent Office 2,780,236
Patented Feb. 5, 1957

2,780,236

LOCKING AND RELEASING MECHANISM FOR FLOAT CONTROLLED PILOT VALVE

John G. Russell, Cleveland, Ohio

Application April 30, 1953, Serial No. 352,169

6 Claims. (Cl. 137—390)

The invention relates to new and useful improvements in a fluid pressure operated valve for filling tanks with which is associated a float controlled pilot valve operating to cause the fluid pressure to close the main valve when the fluid in the tank reaches a predetermined level.

There are times when it is desired to hold the pilot valve closed so as to prevent the main valve from opening under fluid pressure and there are also times when the pilot valve should be free for actuation by the float so that the main valve can be opened by the fluid pressure and the tank filled to a predetermined level.

An object of the invention is to provide a float controlled pilot valve of the above type with an actuating means for normally moving the pilot valve into and holding the same in closed position and with a manually controlled means for rendering said actuating means ineffective whereby the pilot valve may be released for normal actuation by the float.

A further object of the invention is to provide a float controlled pilot valve of the above type with a spring actuated means for normally raising the float into valve closing position and for holding the valve closed and with a manually controlled power means that may be operated to override said spring and release the pilot valve for normal actuation by the float.

A still further object of the invention is to provide a series of tanks connected to a common manifold for filling and draining said tanks wherein each tank is equipped with a float controlled fluid pressure operated intake valve and means whereby the pilot valve of each tank is normally held closed to prevent the opening of the main valve associated therewith by the fluid pressure on the manifold, and wherein manually controlled means is provided for releasing the holding means of a selected tank or tanks for filling the same under control of the float.

These and other objects will in part be obvious and will in part be hereinafter more fully disclosed.

In the drawings:

Figure 1 is a schematic view of one form of fluid pressure controlled intake valve, the view being in vertical section through the valve housing.

Figure 2 is a plan view of the pilot valve housing also showing in plan means for normally holding the float valve closed and also showing the manually controlled releasing means therefor.

Figure 3 is a vertical sectional view through one of the pilot valves showing the means for holding the pilot valve closed and the manually operative releasing means therefor.

Figure 4 is a perspective view showing a portion of the lever on which the float is mounted and the mechanism for raising the float lever so as to close the pilot valve.

Figure 5 is a respective view of a modified form of mechanism for raising the float lever to close the pilot valve and hold the same in closed position.

Figure 6 is a view showing in perspective another form of mechanism for raising the float lever for closing the pilot valve and also in section hydraulic means for releasing the float lever for filling the tank under control of the float.

Figure 7 is a schematic view of a single point fueling system which includes three tanks each of which is equipped with a pilot valve and mechanism for normally locking or holding the pilot valve closed and manually controlled means for releasing the pilot valve so that the tank associated therewith may be filled under float control.

The present invention is employed with a float controlled pilot valve associated with a fluid pressure operated intake valve for a tank. The fluid pressure operated intake valve may be of any well known construction. As illustrated in Figure 1, the valve is of the double diaphragm type. It includes a housing 10 attached to the bottom wall 11 of the tank in any suitable way. The bottom wall of the housing 10 has an intake port 12 connected in the usual way from a pipe leading to a supply system furnishing fluid under pressure. There is a main valve 13 carried by a diaphragm 14. Above the main valve is an auxiliary valve 15. Between the main and auxiliary valves is a chamber 16 and between the auxiliary valve and the end cap 17 of the housing is a second chamber 18. The valve 13 has a restricted opening therethrough so that fluid from the intake port will pass through the port into the chamber 16. There is a passage 19 connecting the chamber 16 to the tube 20 leading to a pilot valve. There is a passage 21 which is connected through a restricted opening 21$^a$ with the intake port. This passage is connected through a passage 21$^b$ to the chamber 18. The passages 21 and 21$^b$ are likewise connected to the tube 22 leading to the second pilot valve. These two pilot valves are independent of each other. One controls the fluid pressure in the chamber 16 and the other independently controls the fluid pressure in the chamber 18.

The pilot valves are mounted in a common housing which includes a top ring 23 and a bottom plate 24 connected by bolts 25. In Figure 2 the two pilot valves 26, 26 and the controls 27, 27 therefor are shown in plan side by side.

In Figure 3 there is shown a vertical sectional view taken on the line 3—3 of Fig. 2 through one of the pilot valves. The bottom plate 24 of the pilot housing has an integral boss 28 extending upwardly into the housing. The boss has a passage 29 therethrough. The lower end of the passage is provided with an adapter to which the tube 20 is connected. The other pilot valve is of similar construction and the passage in the boss thereof receives an adapter for connecting the tube 22 to the pilot valve. In the upper end of the passage through the boss 28 there is an adapter 30 having at the lower end thereof a valve seat 31. Extending through the valve seat is a valve stem 32 carrying at the lower end thereof a valve 33 which when raised is adapted to engage the valve seat 31 and thus close the valve opening. Mounted on lugs carried by the boss 28 is a pivot pin 34. A float lever 35 preferably formed from sheet metal has depending side members which are mounted on the pivot pin 34.

The valve stem 32 is provided with a reduced portion 36 and this reduced portion extends through an opening in the float lever 35. The opening is of smaller diameter than the upper end of the stem 37 so that as the float lever rises the valve will be moved into engagement with the valve seat and close the pilot valve. When the float lever drops or moves downward at its free end the valve will be moved away from the seat and this is the open position of the pilot valve. Mounted on this float lever is a float 38. The gravity energy operating on the float to close the pilot valve is less than the energy of the buoyancy of the fluid in the tank. Therefore, when the tank is being filled the float will be raised and will finally close the pilot valve. This is the normal operation of a float controlled pilot valve. When the pilot valve is closed pressure will develop in one or both of the chambers 16 and 18 which will close the main valves and when the pilot valve is open then the pressure in these chambers will drop and the fluid pressure through the intake will operate to open the valves. This is a normal operation of a fluid pressure operated intake valve and further description thereof is not thought necessary.

Referring to Figures 3 and 4 the float controlled lever 35 is mounted on the pivot pin 34. The upper end of the valve stem 32 is shown in Figure 4. The valve stem is connected to the float lever 35 between the pivot pin 34 and the float 38. When the lever is raised the valve will be moved toward closed position. There are times when it is desirable to move the float lever to its fully raised position so that the pilot valve will be closed. Mechanism has been provided for raising this float lever which includes a rocker 39 formed preferably of sheet metal bent so as to provide side members 40, 40 connected by a top member 41. These side members 40, 40 are mounted on the pivot pin 34 for movement independently of the movement of the float lever. The side members have inwardly bent portions 42, 42 which are adapted to extend beneath the float lever. Brazed to one of the members 40 is a plate 43. Said plate has its end portion bent outwardly away from the rocker as shown at 44. Associated with the pilot valve is a solenoid 45. As shown in Figure 2 there is, of course, a solenoid 45 for each pilot valve. A plunger 46 is connected to the core of the solenoid. Mounted on the plunger is an abutment washer 47 against which the spring 48 bears. The other end of the spring bears against the housing for the solenoid. This spring is of sufficient tension so that when free to move it urges the plunger 46 into contact with the end portion 44 of the plate 43 and this will move the rocker so as to lift the float lever and close the pilot valve. When, however, the solenoid 45 is energized it will withdraw the core thereof inwardly and thus move the plunger 46 out of contact with the member 44. When the solenoid is energized the pull of the solenoid on the plunger will override the tension of the spring so that the plunger is moved out of contact with the member 44 and, therefore, the rocker is free from any lifting action on the float lever and the float lever and float will drop so as to open the pilot valve. As long as the solenoid is energized the float is free to move and control the opening and closing of the pilot valve in the usual way.

It is noted that in Figures 2 and 3 the solenoids are supported on a bracket 49 attached to the base member 24 of the pilot valve housing. The pilot valve housing is supported by the top wall of the tank and the plunger 46 is therefore in a horizontal position and the means for energizing the solenoid will be preferably mounted on the side wall of the tank.

In Figure 5 there is a slight modification of the mechanism for lifting the float lever so as to close the valve and for releasing the float lever for normal operation. In this form of the invention the float lever 35 is pivotally mounted on the usual pivot pin 34 and engages the valve stem in the restricted portion beneath the enlargement or head 37. The rocker 39 is formed of sheet metal and is provided with side walls 39 and 40 which are also bent inwardly as indicated at 42 so as to extend beneath the float lever 35. When the rocker is oscillated in a clockwise direction it will lift the float lever and close the pilot valve. An auxiliary rocker 50 is formed of sheet metal and provided with depending arms 51, 51 which engage the front edge of the member 41 of the main rocker 40. This auxiliary rocker is mounted on the pivot pin 52 which in turn is mounted in lugs 53, 53 carried by the upper ring member 23 of the pilot valve housing. In connection with this arrangement of the float lever lifting mechanism there is a vertically arranged plunger 54 which is adapted to engage a cross member 55 on the auxiliary rocker. An abutment disk 56 is rigidly connected to the plunger 54. This plunger is also connected to the core of the solenoid which in the present case is arranged above the main rocker 40 and preferably attached to the top wall of the tank. Between the abutment disk 56 and the inner end of the solenoid housing is a spring 57. This spring is of such tension that when the solenoid is deenergized and the spring is free to act it will bear on the auxiliary rocker and cause the auxiliary rocker to turn on its pivotal support in a counter-clockwise direction. This will cause the main rocker 39 to turn in a clockwise direction and lift the float lever and float carried thereby so as to close the pilot valve. When, however, the solenoid is energized by a mechanically controlled electric circuit the plunger will be withdrawn with the core of the solenoid and lifted from engagement with the auxiliary rocker 50.

This will release the float lever so that the float will drop by gravity and will be free to move up and down with the level of the liquid in the tank. Of course, when the float lever is released and the pilot valve opened this will permit the fluid pressure on the main intake valve to cause said valve to open. When the tank is filled to a predetermined level the float lever will be raised and cause the main valve to close. This movement of the float lever is possible at any time when the solenoid is energized. Just as soon as the solenoid is deenergized under the manual control therefor, the spring 57 will be free to exert its tension against the auxiliary rocker and this will raise the float lever to its valve closing position and hold or lock the float lever in said position.

In Figure 6 there is a further modified form of mechanism for raising the float lever to valve closing position in which the float lever is released for a normal operation by means of an hydraulically actuated device.

In this form of invention the float lever 35 is mounted on a pivot pin 34 as described above. The upper end of the valve stem 37 is disposed above the lever and when the float lever is raised it will lift the valve stem and close the valve. There is a main rocker 39 pivotally mounted on the rod 34 which is of the construction described above. It has inturned side members 42 extending beneath the float lever and operating to engage and raise the float lever when said rocker is turned in a clockwise direction on the pivot rod 34.

There is a spring 58 which is attached to a lug 59 secured to the rocker 39 and at the upper end of the spring it is attached to a lug 60 carried by the upper ring 23 of the valve housing. There is an auxiliary rocker 53' mounted on a pivot rod 54 which in turn is mounted in lugs 53, 53 as shown in Figure 5. The auxiliary rocker in this form of invention shown in Figure 6 is connected to the main rocker by link 61. Located above the pilot valve housing and preferably attached to the upper wall of the tank is a hydraulic motor which includes a housing 62 across which extends a diaphragm 63 dividing said housing into an upper chamber 64 and a lower chamber 65. Attached to this diaphragm 63 is a plunger 66 which engages the rocker 53' when fluid is introduced into the chamber 64 and forces the diaphragm downwardly. This downward movement of the plunger will turn the auxiliary rocker in a counter-clockwise direction and this will turn the main rocker also in a counter-clockwise direction so as to move the members 42 of the main rocker 39 from engagement with the float lever 35. There is a vent opening 67 connecting the lower chamber of the hydraulic unit to the atmosphere and a spring 68 which raises the diaphragm when the fluid is turned off from the chamber 64. When there is no fluid pressure on the diaphragm the spring 58 is of sufficient tension so as to raise the float lever and close the pilot valve. Fluid may be directed to the chamber 64 through a pipe 69 and the supply of fluid is controlled by a hand valve 70. When the hand valve is closed and the fluid supply to the chambers 64 cut off, then the spring 58 will raise the float lever and float to valve closing position. When the operator wishes to release the float lever for normal operation then the valve 70 is opened, fluid is directed to the chamber 64 and the diaphragm will move downward causing the plunger to contact the auxiliary rocker which in turn will move the main rocker 39 from beneath the float lever and permit the normal free operation of the float and float lever.

In Figure 7 there is illustrated a typical single point fueling system utilizing the holding and releasing mechanism of the present invention. In this illustration there are three fuel tanks 72, 73 and 74, and each tank is provided at its lower side with a fluid pressure operated main valve 75 and a float operated pilot valve 76 connected to the fluid pressure operated valve 75 by a pilot tubing line 77. The intake of each fluid pressure valve is connected to a common intake line 78 by means of pipe lines 79, 80 and 81. The line 78 has a valve 82 connected thereto and to this valve 82 is adapted to be attached a supply nozzle 83 connected to a supply line 84 in which is a flow indicator 85. Each solenoid 45 has one of its electrical leads 86 grounded and the other leads 87, 88 and 89 respectively are connected to switches 90, 91 and 92. The circuits are controlled by a master switch 93.

While the invention has been illustrated in Figures 1, 2 and 3 as applied to a fluid pressure valve having a main valve and an auxiliary valve forming independent chambers, each of which has its associated pilot valve, it will be understood that this holding and releasing mechanism may be utilized without modification in connection with a fluid pressure valve having only one valve for closing the intake and one pressure chamber. In connection with the tanks shown in Figure 7 there is a single main fluid pressure valve and a single pilot valve associated therewith. When the solenoids are deenergized and there is no flow of fluid to the hydraulic power means then the springs in each case will raise the valve lever to closed position and hold or lock it in closed position. When any one of the solenoids is energized then the spring associated therewith will be rendered ineffective and the lever and float will be released for free normal functioning. This improved locking and releasing mechanism for the pilot valve has several advantages. It may be used for testing the functioning of the pilot valve before filling a tank. This is accomplished by turning on the pump for supplying fluid to the tank while the solenoid is deenergized and the pilot valve is therefore in closed position since the float is held by the spring in valve closing position and when the pilot valve is closed then the main fluid pressure valve will not open. If, therefore, there is flow of fluid into the tank when the supply line leading to the fluid pressure valve is turned on this will indicate that something is wrong with the system. Such, for example, may be a puncture in the diaphragm of the main fluid pressure valve or perhaps the failure of the spring to raise the float and close the valve. Assuming that there is no flow, the operator can further test the functioning of the pilot valve by energizing the solenoid which will render the spring ineffective to hold or lock the pilot valve in closed position and the pilot lever will drop and open the valve. This will permit the fluid to open the main valve and fill the tank. If, however, when the spring is rendered ineffective by energizing the solenoid there is still no flow then the operator will know the pilot valve is stuck so that gravity action on the float lever does not open the same.

There is an advantage in this locking and releasing mechanism as applied to a series of tanks as shown in Figure 7. Let us assume that it is desired to fill a selected tank or two of a series, as for example tanks 72 and 74. The main switch 93 is closed, also the switches 90 and 92 which will energize the solenoids associated therewith. This will render the springs of the respective pilot valves ineffective so that the float lever will drop and open the pilot valves. This will permit the fluid from the manifold to open the main valves and fill the tanks 72 and 74. When the switch 92 remains open then the solenoid of tank 73 is deenergized and the pilot valve closed and this prevents the fluid from the manifold opening the fluid pressure valve of tank 73 and no fluid will flow into the tank.

Means is often provided for draining of a tank through the supply manifold when the fluid supply is cut off therefrom. There is also often provided means for transferring the fluid in one tank of a series to another through the manifold. This can be readily accomplished when the tanks are equipped with the holding and releasing means of the present invention. For example, if it is desired to transfer the fluid from tank 73 to tank 72 as shown in Figure 7 then the fluid supply is cut off from the main manifold and fluid is directed from the tank 73 into the manifold. The solenoid 86 is energized which will release the pilot valve so that the fluid can flow through the main intake valve into the tank 72. It cannot flow, however, into tank 74 because the solenoid of the tank 74 is still deenergized and the intake valve held closed.

It is obvious that many changes may be made in the details of construction and arrangement of parts without departing from the spirit of the invention as set forth in the appended claims.

I claim:

1. A locking and releasing mechanism for a float controlled pilot valve having a valve controlling lever movable by a float into valve opening and closing positions comprising a rocker engageable with said float lever for moving the latter into valve closing position, a spring actuated plunger for moving said rocker to close the valve and for normally holding the same in closed position, and a solenoid for withdrawing the plunger from operative engagement with the rocker to release the pilot valve lever for actuation by said float.

2. A locking and releasing mechanism for a float controlled pilot valve having a valve controlling lever movable by a float into valve opening and closing positions comprising, a main rocker engageable with said float lever for moving the latter into valve closed position, an auxiliary rocker engageable with said main rocker for oscillating the same to raise the float lever, and a spring actuated plunger engageable with the auxiliary rocker for moving the same to cause the main rocker to lift the float lever and close the pilot valve, and manually controlled power means for overriding the spring and withdrawing the plunger from operative engagement with said auxiliary rocker to free the pilot valve lever for actuation by the float.

3. A locking and releasing mechanism for a float controlled pilot valve having a valve controlling lever movable by a float into valve opening and closing positions comprising a main rocker engageable with said float lever for moving the latter into valve closed position, an auxiliary rocker engageable with said main rocker for oscillating the same to raise the float lever, and a spring actuated plunger engageable with the auxiliary rocker for moving the same to cause the main rocker to lift the float lever and close the pilot valve, and a manually controlled solenoid for withdrawing said plunger from engagement with said auxiliary rocker to free the pilot valve lever for actuation by the float.

4. A locking and releasing mechanism for a float controlled pilot valve having a valve controlling lever movable by a float into valve opening and closing positions comprising, a main rocker engageable with the float lever for raising the same to close the valve, a spring for causing said rocker to move and normally hold said valve in closed position, an auxiliary rocker connected to said main rocker, and manually controlled means operating through said auxiliary rocker for overriding said spring to release said float lever for normal actuation by said float.

5. A locking and releasing mechanism for a float controlled pilot valve having a valve controlling lever movable by a float into valve opening and closing positions comprising, a main rocker engageable with the float lever for raising the same to close the valve, a spring for moving said rocker to move and normally hold said valve in closed position, an auxiliary rocker connected to said main rocker, and a plunger engageable with said auxiliary rocker and a hydraulic means for moving said plunger into engagement with said auxiliary rocker for overriding said spring to release said float lever for normal actuation by said float.

6. A locking and releasing mechanism for a float controlled pilot valve having a valve controlling lever movable by a float into valve opening and closing positions comprising rocker means including a part engageable with said float lever for moving the latter into valve closing position, a spring actuated plunger for moving said rocker means to cause said part to engage the float lever in a manner for bringing about a closing of the valve and effective for normally holding the rocker means in the valve closed position, and solenoid means for withdrawing the plunger from operative engagement with the rocker means to release the pilot valve lever for actuation by the float.

References Cited in the file of this patent

UNITED STATES PATENTS

| | | |
|---|---|---|
| 2,199,538 | Curry | Mar. 7, 1940 |
| 2,309,770 | Johnson | Feb. 2, 1943 |
| 2,477,186 | Koehler | July 26, 1949 |
| 2,619,108 | Sweeney | Nov. 25, 1952 |